United States Patent
Iimori et al.

(10) Patent No.: US 10,286,859 B2
(45) Date of Patent: May 14, 2019

(54) WIRE HARNESS WATERPROOFING STRUCTURE

(71) Applicant: Yazaki Corporation, Tokyo (JP)

(72) Inventors: Yasuo Iimori, Makinohara (JP); Yasuhiro Mochizuki, Makinohara (JP); Yoshinori Nakamura, Makinohara (JP); Kei Nunome, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/399,397

(22) PCT Filed: May 8, 2013

(86) PCT No.: PCT/JP2013/063474
§ 371 (c)(1),
(2) Date: Nov. 6, 2014

(87) PCT Pub. No.: WO2013/168823
PCT Pub. Date: Nov. 14, 2013

(65) Prior Publication Data
US 2015/0144397 A1    May 28, 2015

(30) Foreign Application Priority Data
May 9, 2012  (JP) .................................. 2012-107892

(51) Int. Cl.
*B60R 16/02*    (2006.01)
*H02G 3/04*    (2006.01)

(52) U.S. Cl.
CPC ...... *B60R 16/0222* (2013.01); *B60R 16/0215* (2013.01); *H02G 3/0406* (2013.01)

(58) Field of Classification Search
CPC ............ B60R 16/0215; B60R 16/0222; H02G 3/0406
(Continued)

(56) References Cited

U.S. PATENT DOCUMENTS 6,241,554 B1 *   6/2001   Murakami ........... H01R 13/506
439/587
2002/0062975 A1   5/2002   Matsunaga
(Continued)

FOREIGN PATENT DOCUMENTS

CN        1214807 A     4/1999
CN     101102036 A     1/2008
(Continued)

OTHER PUBLICATIONS

Search Report dated Aug. 21, 2013, issued by the International Searching Authority in counterpart International Application No. PCT/JP2013/063474.
(Continued)

*Primary Examiner* — Chau N Nguyen
(74) *Attorney, Agent, or Firm* — Sughrue Mion, PLLC

(57) ABSTRACT

A wire harness waterproofing structure includes a grommet that includes a pipe-formed body part the periphery of which is watertightly attached to a through hole which is bored in a body panel which separates a compartment outside part and a compartment inside part, and a small diameter tubular part one end of which is connected to the pipe-formed body part, a wire harness that includes a plurality of electric wires inserted through the tubular part in an unbound state and is wired with a predetermined height difference relative to the through hole, a diameter-increased part that are provided on at least one of the electric wires to forms a gap between the electric wires adjacent to the one of the electric wires.

15 Claims, 8 Drawing Sheets

(58) Field of Classification Search
USPC .............................. 174/72 A, 77 R, 93, 22 R
See application file for complete search history.

(56) References Cited

U.S. PATENT DOCUMENTS

| | | | | |
|---|---|---|---|---|
| 2008/0009175 A1* | 1/2008 | Kamenoue | ......... | B60R 16/0222 439/397 |
| 2013/0126232 A1 | 5/2013 | Sakuma | | |

FOREIGN PATENT DOCUMENTS

| | | | | |
|---|---|---|---|---|
| CN | 101777706 | A | | 7/2010 |
| EP | 1876067 | A1 | | 1/2008 |
| JP | 07-021862 | A | | 1/1995 |
| JP | 2002-58140 | A | | 2/2002 |
| JP | 2005-071790 | A | | 3/2005 |
| JP | 2005071790 | A | * | 3/2005 |
| JP | 2008-017638 | A | | 1/2008 |
| JP | 2008-17638 | A | | 1/2008 |
| JP | 2008-271731 | A | | 11/2008 |
| WO | 97/31415 | A2 | | 8/1997 |
| WO | 97/36355 | A1 | | 10/1997 |
| WO | 97/49539 | A1 | | 12/1997 |
| WO | 2012/035811 | A1 | | 2/2012 |

OTHER PUBLICATIONS

Written Opinion dated Aug. 21, 2013, issued by the International Searching Authority in counterpart International Application No. PCT/JP2013/063474.
Notification of Reasons for Refusal issued on Jan. 26, 2016 by the Japanese Patent Office in related Application No. 2012-107892.
Machine Translation of JP 07-021862 (Published on Jan. 24, 1995), which was cited in the IDS filed on Nov. 6, 2014.
Communication dated May 12, 2016, from the State Intellectual Property Office of People's Republic of China in counterpart Application No. 201380024487.0.
Office Action issued Mar. 17, 2017 by the European Patent Office in counterpart European Patent Application No. 13725492.6.

* cited by examiner

WIRE HARNESS WATERPROOFING STRUCTURE

TECHNICAL FIELD

The present invention relates to a wire harness waterproofing structure.

BACKGROUND ART

As shown in FIG. 8, a grommet 505 is proposed to dispose a wire harness 503 to penetrate through a body panel 501 of an automobile. The periphery of the wire harness 503 illustrated in the figure is covered by a protective member 511 such as a protective tube or tape in a compartment outside part 507 and a compartment inside part 509 which are separated by a body panel 501. A large-diameter body part 513 of the grommet 505 is fitted within a through hole 515 of the body panel 501 watertightly. For the wire harness 503, while a space between the through hole 515 and the body part 513 is waterproofed, a space between the body part 513 and the wire harness 503 (that is, inside the grommet) is waterproofed.

The waterproofing inside the grommet is carried out by a waterproofing structure disclosed, for example, in PTL 1. That is, as shown in FIG. 9, waterproofing agent 519 is applied between the peripheries of electric wires 517. A waterproofing sheet 523 is wound around a waterproofing part 521 where the waterproofing agent 519 is applied so that the electric wires are bound into an electric wire bunch which has a circular section. Tapes 525 are wound around both ends of the waterproofing sheet 523. The wire harness 503 which has the waterproofing part 521 formed in this way is mounted to the grommet 505 by closely fitting the waterproofing part 521 in a wire harness through hole 514.

On the other hand, in the wire harness waterproofing structure in which a grommet is used, a solution which does not use the waterproofing agent 519 is proposed. For example, in the wire harness waterproofing structure disclosed in PTL 2, as shown in FIG. 10, a body part 513 of a grommet 529 is mounted to a through hole 515 of a dash panel 527 which separates an engine room and a compartment inside part, a long tube 531 is coupled to the body part 513, and the tube 531 is arranged inside the engine room which is the compartment outside part 507. The wire harness 503 in an unbound state is inserted through the body part 513 and inside the tube 531, and in this state, at least two throttle parts (a first fixed part 533 and a second fixed part 535) where the inside diameter of the tube 531 is narrowed down are provided at a position close to the distal end of the tube 531 and at a position which is spaced from the above position and near the body part. In the throttle parts, the inside diameter of the tube 531 is narrowed down by tightening fixing bands 537 to the periphery of the tube 531. By providing a flexed part 539 in the wire harness 503 drawn out from the grommet 529, the electric wires 517 are loosened.

CITATION LIST

Patent Literature

PTL 1: JP-A-2005-71790
PTL 2: JP-A-2008-17638

SUMMARY OF INVENTION

Technical Problem

However, for the wire harness 503 disclosed in PTL 1, the filling operation is tedious, it takes time to dry the waterproofing agent 519, and the waterproofing operation takes a long time. Because the waterproofing agent 519 is used, the cost is increased. Further, for the wire harness waterproofing structure disclosed in the PTL 2, it is tedious to insert the electric wires 517 through the long tube 531, the waterproofing operation takes a long time, the large grommet 529 is necessary, and the cost is increased. It cannot be determined surely from the outside whether there is a gap between the electric wires 517 that are inserted inside the tube 531. Therefore, a capillary action may occur.

The present invention is made in view of the above situations, and the object of the present invention is to provide an inexpensive wire harness waterproofing structure which can shorten the waterproofing operation time.

Solution to Problem

The above object of the present invention is accomplished by the following constructions.

(1) According to an aspect of the invention, a wire harness waterproofing structure includes a grommet that includes a pipe-formed body part the periphery of which is watertightly attached to a through hole which is bored in a body panel which separates a compartment outside part and a compartment inside part, and a small diameter tubular part one end of which is connected to the pipe-formed body part, a wire harness that includes a plurality of electric wires inserted through the tubular part in an unbound state and is wired with a predetermined height difference relative to the through hole, a diameter-increased part that are provided on at least one of the electric wires to forms a gap between the electric wires adjacent to the one of the electric wires.

According to the wire harness waterproofing structure of the construction of the above (1), after the rising wired part of the wire harness is inserted through the tubular part of the grommet, the grommet is attached to the body panel so that the lower end opening part of the tubular part becomes the side of the wet part of the wire harness (the side of the compartment outside part). Then, because there is the predetermined height difference between the lower end opening part of the tubular part at the side of the compartment outside part where water at the wet part is sucked up and the upper end opening part, the water is hard to enter to the side of the compartment inside part. Furthermore, the water at the wet part may be sucked up because of capillary action with the rising wired part, the plurality of electric wires of which are inserted through the tubular part, but the adjacent electric wires are separated by the thickness of the diameter-increased part by the diameter-increased part which is protruded from the periphery of at least one electric wire, and the gap between the electric wires is increased. Thus, the height of the water which is sucked up because of capillary action (possible suction height) is decreased because the gap between electric wires is increased, and in comparison with that the diameter-increased part is not protruded from the periphery of the electric wire which is inserted through the tubular part, it is possible to lower the height difference between the lower end opening part and the upper end opening part of the tubular part of the grommet (to shorten the length of the tubular part).

(2) In the wire harness waterproofing structure according to (1), the one of the electric wires has the largest outer diameter among the plurality of electric wires.

According to the wire harness waterproofing structure of the construction of the above (2), when electric wires are in contact with each other, the electric wire which has the largest diameter and whose gap is smaller than those of the smaller diameter electric wires is separated from other electric wires by the diameter-increased part. Because the gap between the large diameter electric wires is narrower than the gap between the small diameter electric wires, and the suction height of the water that is sucked up because of capillary action is larger, by increasing the gap between the electric wire which has the largest diameter and other electric wires with the diameter-increased part, the suction height of the water because of capillary action can be lowered effectively.

(3) In the wire harness waterproofing structure according to (2) the wire harness includes a plurality of kinds of electric wires having outer diameters different from each other and a plurality of electric wire having the same outer diameter as each other, and the diameter-increased parts that are provided on all of the electric wires having an outer diameter that is equal to or larger than a predetermined diameter determined in accordance with the predetermined height difference.

According to the wire harness waterproofing structure of the construction of the above (3), the wire harness in which a plurality of kinds of electric wires of different outer diameters are mixed has a plurality of electric wire groups which include electric wires of the same outer diameters, and the electric wires in the electric wire group including the electric wires that have such a predetermined outer diameter that the gap between the adjacent electric wires is formed in accordance with the predetermined height difference, and all of the electric wires of the electric wire groups including the electric wires whose diameters are larger than the predetermined outer diameter are provided with the diameter-increased parts. Therefore, the suction of water because of capillary action can be prevented efficiently while the distance of the required height difference is minimized.

That is, the height of the water sucked up because of capillary action is roughly fixed for each of the outer diameters of the electric wires, and becomes higher for the large diameter electric wires for which the gap between the adjacent electric wires becomes small. Thus, when a plurality of kinds of electric wires of different outer diameters are mixed and there are a plurality of electric wires of the same outer diameter, respectively, if the electric wires in the electric wire group including the electric wires of a predetermined outer diameter for which the gap between the adjacent electric wires is formed, and all of the electric wires of the electric wire groups including the electric wires whose diameters are larger than the predetermined outer diameter are provided with the diameter-increased parts, the distance of the height difference to be required can be set.

Further, in the specification, the electric wire groups including the electric wires of the same outer diameters in the wire harness are not necessarily electric wire bunches that physically combine electric wires of the same outer diameters, but may conceptually indicate a plurality of electric wires of the same outer diameter in an unbound state in the wire harness.

Advantageous Effects of Invention

According to the wire harness waterproofing structure of the present invention, the waterproofing operation time can be shortened and the wire harness waterproofing structure is inexpensive.

The present invention has been clearly disclosed above. Further, the present invention will become more apparent and understandable from the description of the following embodiments of the invention (hereinafter referred to as "embodiments").

DESCRIPTION OF EMBODIMENTS

Below, embodiments of the present invention are described with reference to the figures.

Figure 1:
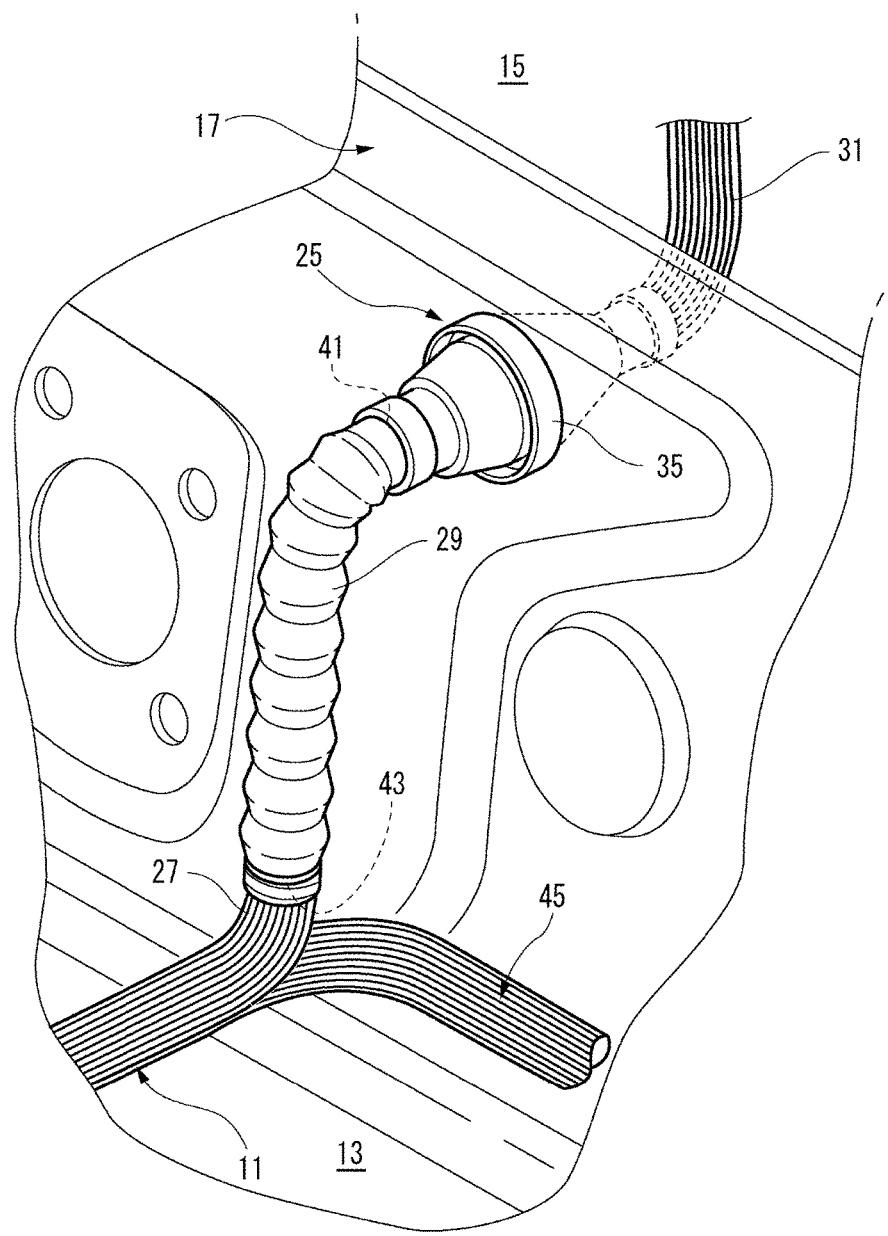
FIG. 1 is a schematic perspective view of a body panel penetrating part in which a wire harness is wired with a wire harness waterproofing structure according to the present invention.
Figure 2:
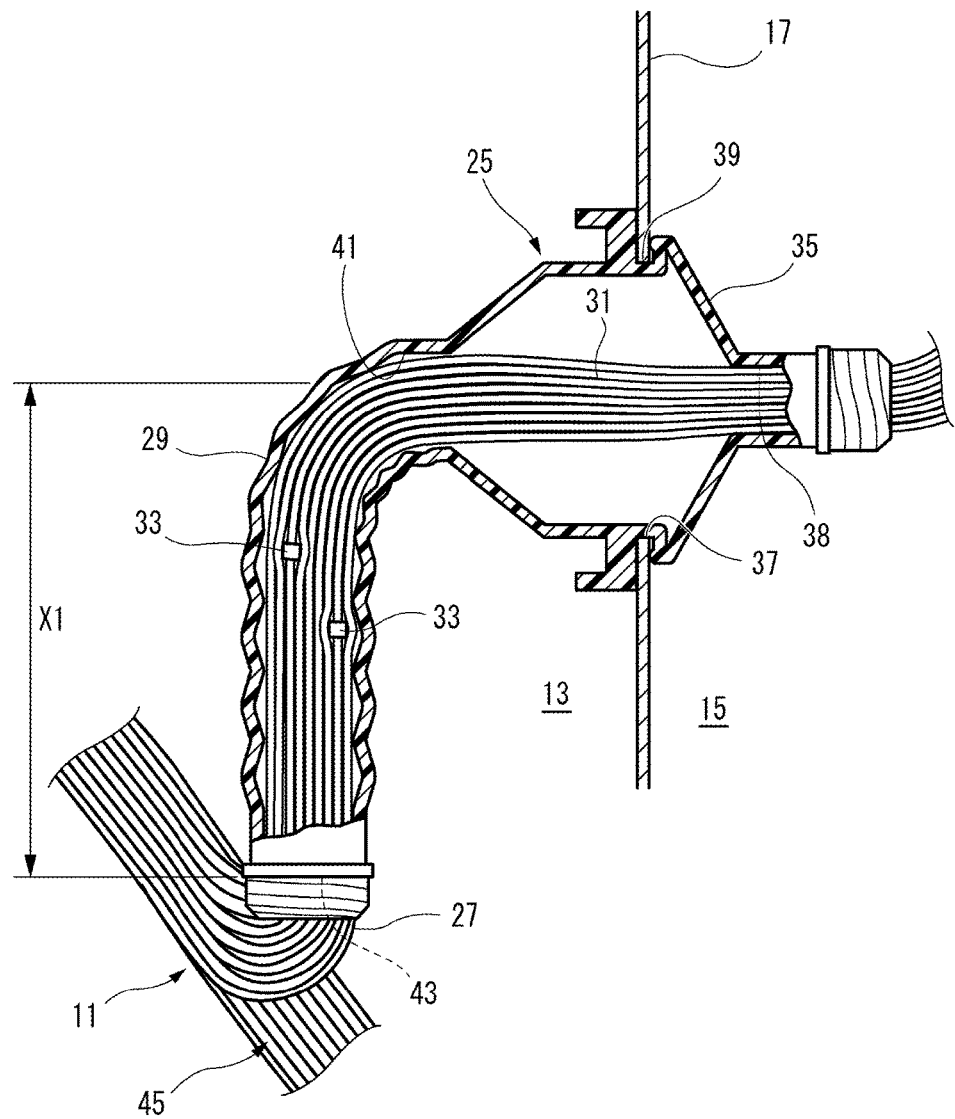
FIG. 2 is a sectional view of the wire harness waterproofing structure shown in FIG. 1.

As shown in FIGS. 1 and 2, a wire harness waterproofing structure according to the present embodiment is preferably used in a waterproofing part when a wire harness 11 is wired through a body panel 17 that separates a compartment outside part 13 and a compartment inside part 15. For example, the compartment outside part 13 is an engine room, and, for example, the body panel 17 is a dash panel. The periphery of the wire harness 11 may be covered by a protective member such as a protective tube. Vibration-proofing materials or a protector not shown in the figure may be attached to the wire harness 11.

The wire harness waterproofing structure of the present embodiment is different roughly in three constructions. First, a grommet 25 is included. Second, the wire harness 11 has a rising wired part 27. Third, electric wires 31 which are inserted through a tubular part 29 of the grommet 25 are provided with diameter-increased parts 33. In addition, not using waterproofing agent becomes a requirement.

The large diameter side of the grommet 25, which is a pipe-formed (funnel-formed, in the present embodiment) elastic body, is formed as a body part 35. The periphery of the large diameter side of the body part 35 is formed with a circular panel fitting groove 39 which is watertightly fitted in a through hole 37 of the body panel 17. At the side of the compartment inside part 15 (right side in FIG. 2), the body part 35 is provided with a harness through hole 38 through which the wire harness 11 is inserted, and at the side of the compartment outside part 13 (left side in FIG. 2), a tubular part 29 is provided through which the wire harness 11 including a plurality of electric wires 31 in an unbound state is inserted. The tubular part 29 may be formed integrally with the body part 35, or tubular part 29 may be separately provided and connected to the body part 35 watertightly.

An upper end opening part 41, which is one end of the tubular part 29, is connected to the body part 35, and a lower end opening part 43 of the tubular part 29 becomes a wet part 45 of the wire harness 11.

The wire harness 11 has a rising wired part 27 in which the plurality of electric wires 31 in the unbound state are wired with a predetermined height difference from the through hole 37, and the rising wired part 27 rises from a position of the compartment outside part 13 which is lower than the through hole 37 and is inserted through the grommet 25. The rising wired part 27 is inserted inside the tubular part 29.

It is possible that only the electric wires are inserted through the tubular part 29, or the electric wires covered with protective members may be inserted through the tubular part 29. The rising wired part 27 may be vertical, may be inclined, or may include a vertical part and a bent part that are consecutive as shown in the figure. However, it is necessary for the wiring course from the lower end opening part 43 to the upper end opening part 41 to have a predetermined height difference. That is, the grommet 25 in the present embodiment is so arranged that the upper end opening part 41 of the tubular part 29 is higher than the lower end opening part 43 located at the wet part 45 by a predetermined distance X1. The upper end opening part 41 side of the tubular part 29 of this predetermined distance X1 becomes a waterproofing area.

Figure 3:
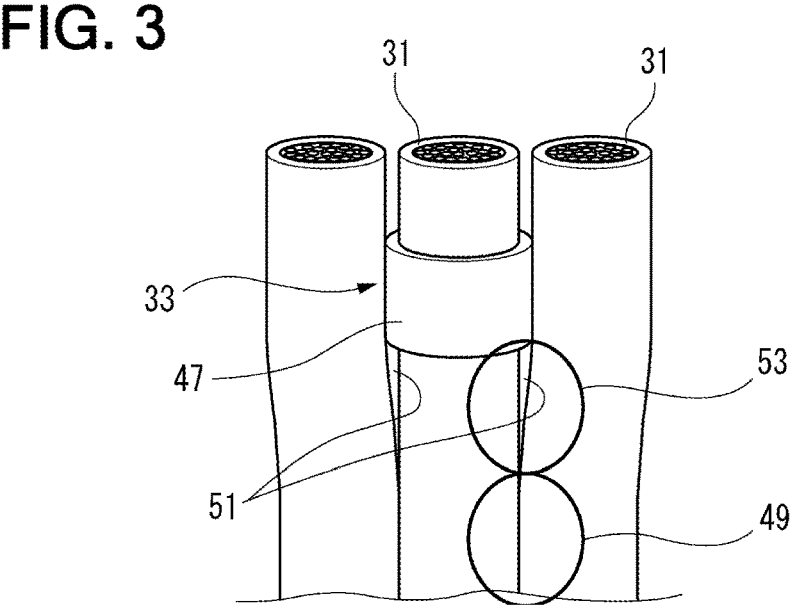
FIG. 3 is an enlarged view of main parts in FIG. 2.

A diameter-increased part 33 along the circumferential direction, as shown in FIG. 3, is protruded from the periphery of at least one of the electric wires 31 of the wire harness 11 which is inserted through the tubular part 29. The diameter-increased part 33 is protruded in the electric wire radial direction outwards from the outer peripheral surface of the electric wire 31, and refers to a part formed along the circumferential direction of the electric wire 31. The diameter-increased part 33 is preferably continued in the circumferential direction, but may be separated.

It is possible that the diameter-increased part 33 is formed by winding, for example, a tape 47 for several laps. In this embodiment, the diameter-increased part 33 is formed by winding the tape 47 which has an adhesive surface at one side for about one lap. In addition, the diameter-increased part 33 may be a tubular member such as a rubber tube, or may be formed by making a part of the coating of the electric wire 31 have a convex shape. It is preferable that the surface of the diameter-increased part 33 has water repellency.

As shown in FIG. 3, by providing the diameter-increased part 33, a gap 51 is formed at an electric wire contact part or electric wire approaching part (hereinafter referred to as "capillary action outbreak part 49") where the electric wires 31 came in contact with each other, so that an area (hereinafter referred to as a "capillary action preventing part 53") where capillary action stops is formed. At the capillary action outbreak part 49, the gap 51 is narrow and water is sucked up. At the capillary action preventing part 53, because the gap 51 is wide, water will not be sucked up.

Capillary action between electric wires, atmospheric pressure difference between the inside and the outside of a vehicle compartment, and temperature difference between the inside and the outside of a vehicle compartment are exemplified as main factors that affect the suction of water. Among them, because the influences of the atmospheric pressure difference and the temperature difference on the suction operation of water are smaller than that of the capillary action, the suction of water mainly occurs because of the capillary action.

The inventor investigated the gap 51 where the suction of water stops. The test is performed when the electric wire 31 is wound with tape and a gap 51 of around 0.1-1.0 mm is formed. As a result of performing the tape winding at a position, for example, where the predetermined distance from the wet part 45, $X1 \approx 50$ mm, to get the above gap 51, and having investigated the suction height of water, the suction of water stopped.

That is, the quantity of the gap 51 is appropriately determined by conditions (electric wire diameters, coating materials, coarseness or water repellency of coated surfaces) in the electric wires 31. Furthermore, it is found that as an electric wire diameter forming the gap 51 increases, it is necessary to increase the gap 51.

Figure 4:
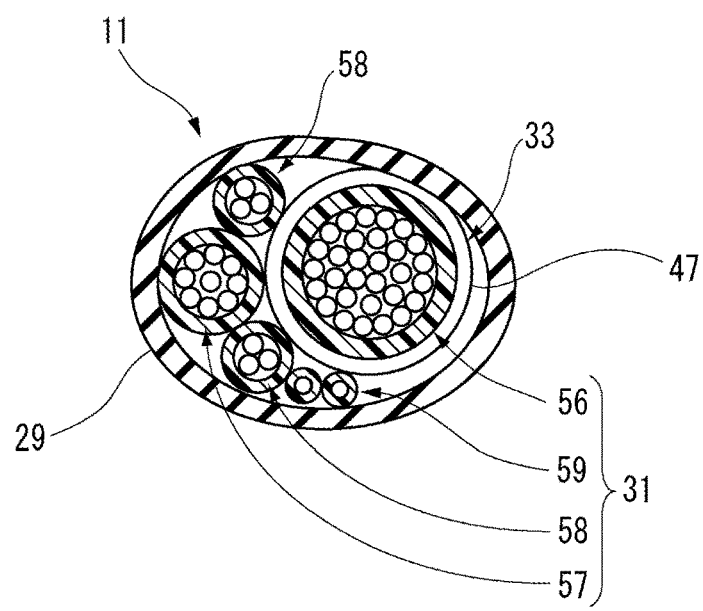
FIG. 4 is a cross-sectional view of the wire harness in which various kinds of electric wires are mixed.
Figure 5A:
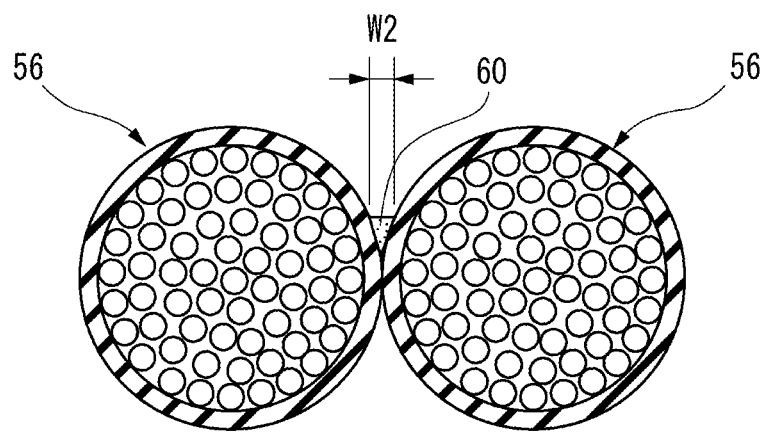
FIG. 5A is a cross-sectional view of large diameter electric wires between which a gap is narrow.
Figure 5B:
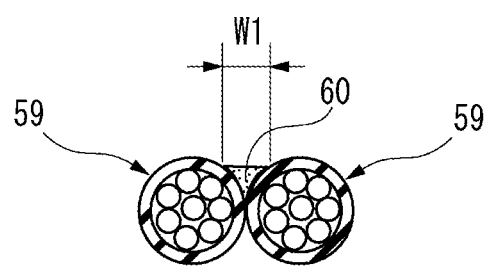
FIG. 5B is a cross-sectional view of small diameter electric wires between which a gap is wide.

FIG. 4 is a cross-sectional view of the wire harness 11 in which various kinds of electric wires are mixed. FIG. 5A is a cross-sectional view of large diameter electric wires 56 between which a gap 51 is narrow, and FIG. 5B is a cross-sectional view of small diameter electric wires 59 between which a gap 51 is wide.

In the wire harness 11, as shown in FIG. 4, electric wires 31 of various outer diameters including a large diameter electric wire 56, middle diameter electric wires 57 and 58, and small diameter electric wires 59 may be mixed and bundled up. In this case, it is desirable that the large diameter electric wire 56 which has the largest outer diameter among the plurality of electric wires 31 is provided with the diameter-increased part 33. As shown in FIGS. 5A and 5B, it is conceivable from the section shapes of water 60 when being sucked up that, a width W1 for the small diameter electric wires 59 whose diameter is small is wide, and a width W2 for the large diameter electric wires 56 whose diameter is large is narrow. Thus, it can be said that as an electric wire diameter gets larger, because the section width of the water 60 when being sucked up between electric wires gets narrower, the suction height becomes higher.

Therefore, in the wire harness waterproofing structure of the present embodiment, as shown in FIG. 2, it is desirable to identify those electric wires 31 for which it is necessary to provide the diameter-increased part 33 sequentially from the large diameter electric wire 56, to the middle diameter electric wires 57 and 58 and the small diameter electric wires 59 so that the suction height of water due to the capillary action becomes less than the predetermined distance X1.

Then, the operation of the wire harness waterproofing structure having the above construction is described.

In the wire harness waterproofing structure of the present embodiment, after the rising wired part 27 of the wire harness 11 is inserted through the tubular part 29 of the grommet 25, the grommet 25 is attached to the body panel 17 so that the lower end opening part 43 of the tubular part 29 becomes the side of the wet part 45 of the wire harness 11 (the side of the compartment outside part 13). In this case, the lower end opening part 43 of the tubular part 29 or the wet part 45 of the wire harness 11 in the compartment outside part 13 is arranged downward with the predetermined X1 from the grommet 25 by the rising wired part 27.

Then, because there is the predetermined height difference (predetermined distance X1) between the lower end opening part 43 of the tubular part 29 where water at the wet part 45 is sucked up and the upper end opening part 41, the water is hard to enter to the side of the compartment inside part 15. Furthermore, the water at the wet part 45 may be sucked up because of capillary action with the rising wired part 27 the plurality of electric wires 31 of which are inserted through the tubular part 29, but the adjacent electric wires 31 are separated by the thickness of the diameter-increased part 33 by the diameter-increased part 33 which is protruded from the periphery of at least one electric wire 31, and the gap 51 between the electric wires 31 is increased.

Thus, the height of the water which is sucked up because of capillary action (possible suction height) is decreased because the gap 51 is increased, and in comparison with that the diameter-increased part 33 is not protruded from the periphery of the electric wire 31 which is inserted through the tubular part 29, it is possible to lower the height difference between the lower end opening part 43 and the upper end opening part 41 of the tubular part 29 of the grommet 25 (to shorten the length of the tubular part 29).

With the wire harness waterproofing structure of the present embodiment, when the large diameter electric wire 56, the middle diameter electric wires 57 and 58, and the small diameter electric wires 59 are in contact with each other, the large diameter electric wire 56 whose gap 51 is smaller than those of the small diameter electric wires 59 is separated from other electric wires (the middle diameter electric wires 57 and 58, and the small diameter electric wires 59) by the diameter-increased part 33. Because the gap 51 between the large diameter electric wires 56 is narrower than the gap 51 between the small diameter electric wires 59, by increasing the gap 51 between the large diameter electric wires 56 with the diameter-increased part 33, the suction height of the water because of capillary action can be lowered effectively.

Next, a variation of the above construction is described.

Figure 6:
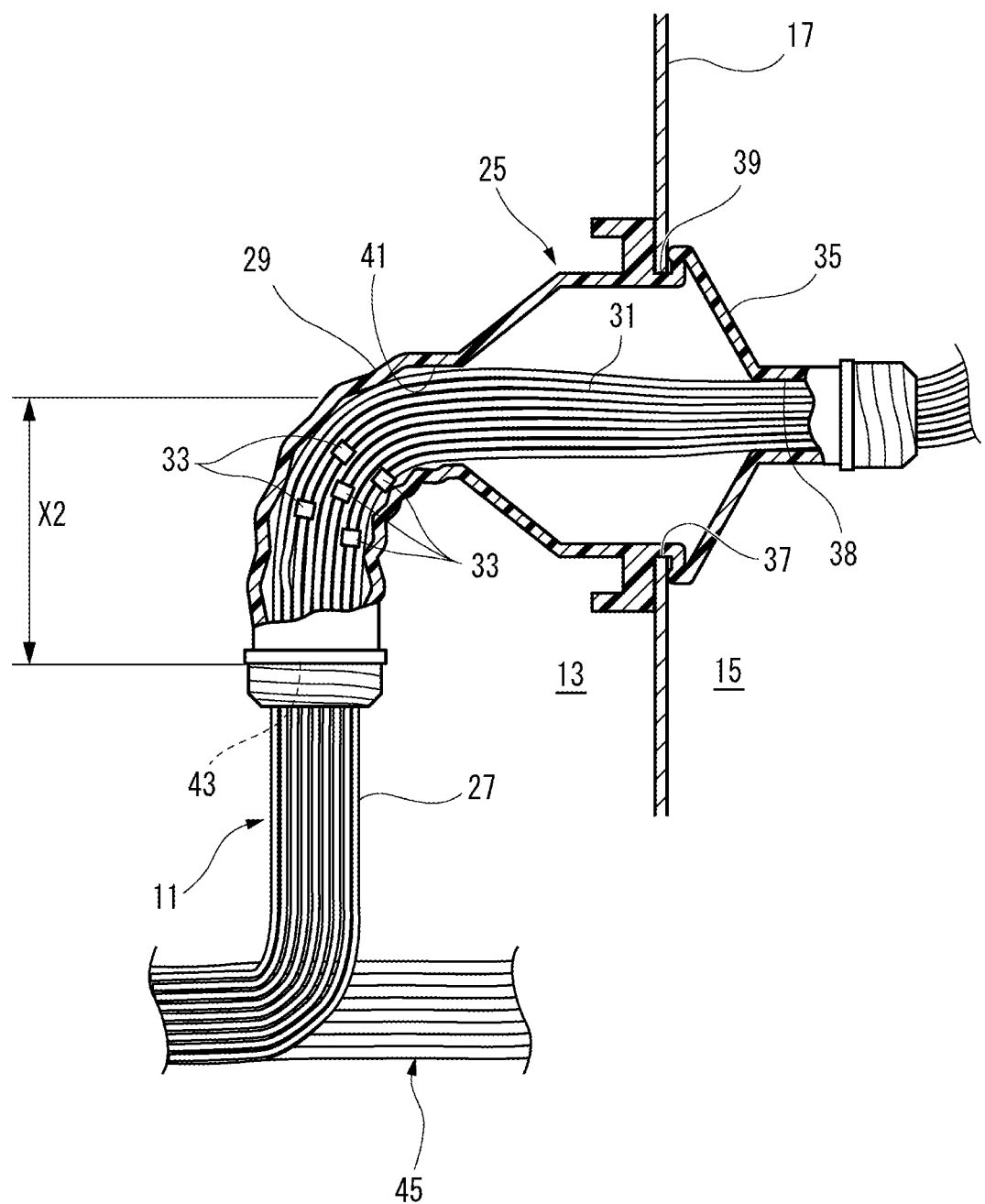
FIG. 6 is a sectional view of a wire harness waterproofing structure when a tubular part of a grommet cannot be made large.

FIG. 6 is a sectional view of a wire harness waterproofing structure when the tubular part 29 of the grommet 25 cannot be made large. The same components in the following variations as those described in FIGS. 1 to 5 are given the same symbols, and their descriptions are omitted.

As shown in FIG. 6, if the tubular part 29 of the grommet 25 in the wire harness waterproofing structure cannot be large (long), the positions and number of the electric wires 31 that are provided with the diameter-increased part 33 are identified to satisfy that a predetermined distance X2 is shorter than the predetermined distance X1 (X1>X2).

For example, the wire harness 11 has a plurality of electric wire groups including electric wires 31 of the same outer diameters while a plurality of kinds of electric wires 31 of different outer diameters (large diameter electric wires 56, middle diameter electric wires 57 and 58, and small diameter electric wires 59) are mixed. The electric wires 31 in the electric wire group including the middle diameter electric wires 58 which are the electric wires that have such a predetermined outer diameter that the gap 51 between the adjacent electric wires 31 is formed in accordance with the predetermined height difference (predetermined distance X2), and all of the electric wires 31 of the electric wire groups including the middle diameter electric wire 57 and the large diameter electric wire 56 which are the electric wires whose diameters are larger than that of the electric wires 58 of the predetermined outer diameter are provided with the diameter-increased parts 33. Therefore, the suction of water because of capillary action can be prevented efficiently while the predetermined distance X2 of the required height difference is minimized, and the length of the tubular part 29 can be shortened.

That is, the height of the water sucked up because of capillary action is roughly fixed for each of the outer diameters of the electric wires 31, and becomes higher for the large diameter electric wires 56 for which the gap 51 between the adjacent electric wires 31 becomes small. Thus, when the large diameter electric wires 56, the middle diameter electric wires 57 and 58, and the small diameter electric wires 59 of different outer diameters are mixed and there are a plurality of electric wires 31 of the same outer diameter, respectively, if the electric wires 31 in the electric wire group including the middle diameter electric wires 58 for which the gap 51 between the adjacent electric wires 31 is formed, and all of the electric wires 31 of the electric wire groups including the middle diameter electric wire 57 and the large diameter electric wire 56 which are the electric wires whose diameters are larger than that of the electric wires 58 of the predetermined outer diameter are provided with the diameter-increased parts 33, the predetermined distance X2 of the height difference to be required can be set.

If the wire harness 11 shown in FIG. 4 is described as an example, in the wire harness 11, the electric wire group including the large diameter electric wire 56 are constructed by one electric wire, the electric wire group including the middle diameter electric wire 57 are constructed by one electric wire, the electric wire group including the middle diameter electric wires 58 are constructed by two electric wires, and the electric wire group including the small diameter electric wires 59 are constructed by two electric wires, respectively. When the electric wires 31 in the electric wire group including the middle diameter electric wires 58 for which the gap 51 between the adjacent electric wires 31 is formed in accordance with the predetermined height difference (predetermined distance X2), and all of the electric wires 31 of the electric wire groups including the middle diameter electric wire 57 and the large diameter electric wire 56 are provided with the diameter-increased parts 33, all of the one large diameter electric wire 56, the one middle diameter electric wire 57 and the two middle diameter electric wires 58 are provided with the diameter-increased parts 33. This is because if any of the electric wires 31 in the electric wire group including the two middle diameter electric wires 58 for which the gap 51 is formed and the electric wires 31 of the electric wire groups including the one large diameter electric wire 56 and the one middle diameter electric wire 57 which are the electric wires whose diameters are larger than that of the middle diameter electric wires 58 is not provided with the diameter-increased part 33, the gap between the electric wire 31 which is not provided with the diameter-increased part 33 and other electric wires is not widened, and there is a possibility that the suction height of water because of capillary action might not be able to be lowered below the predetermined distance X2.

Figure 7:
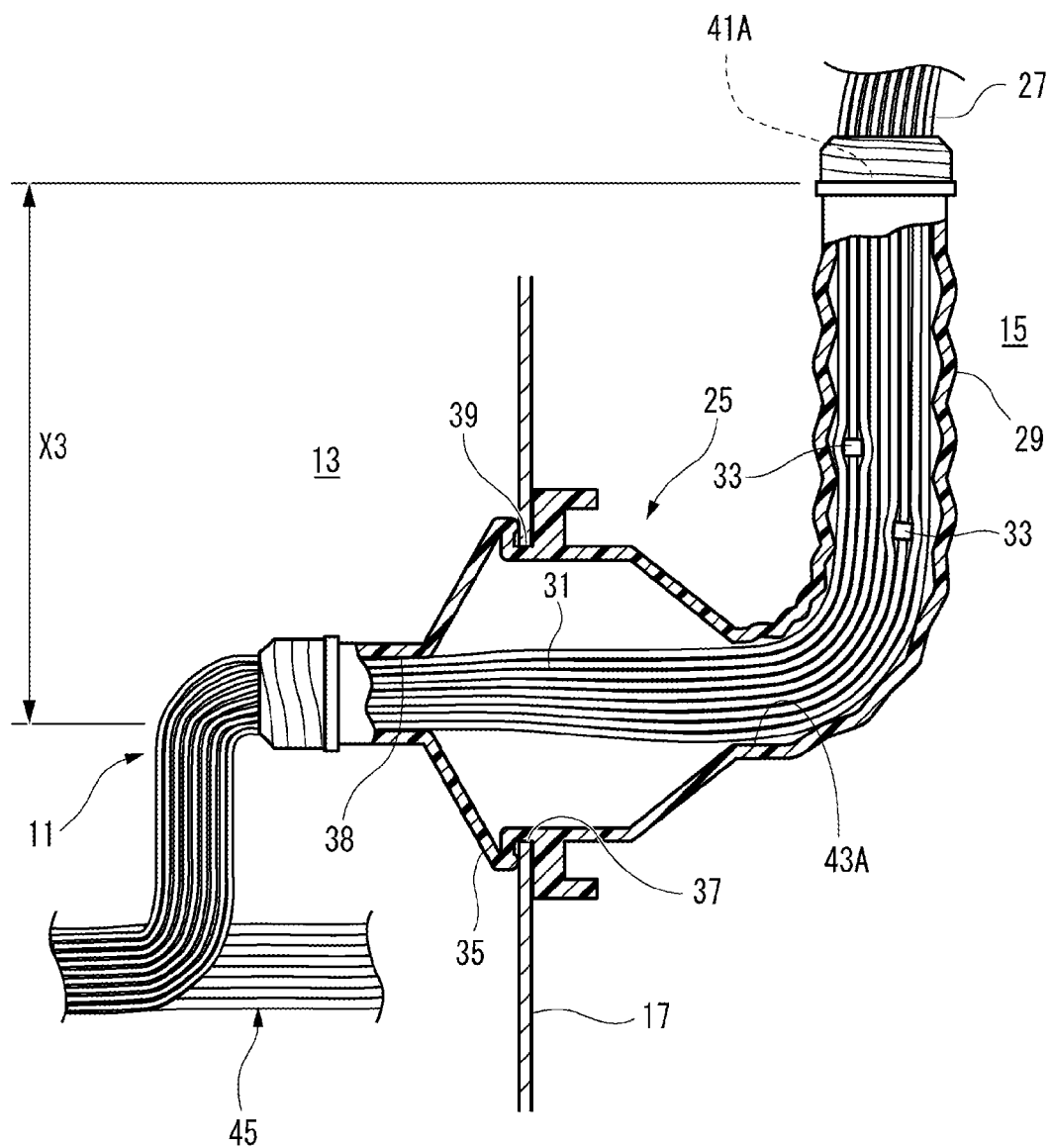
FIG. 7 is a sectional view of a wire harness waterproofing structure in which the tubular part is provided at the side of a compartment inside part.
Figure 8:
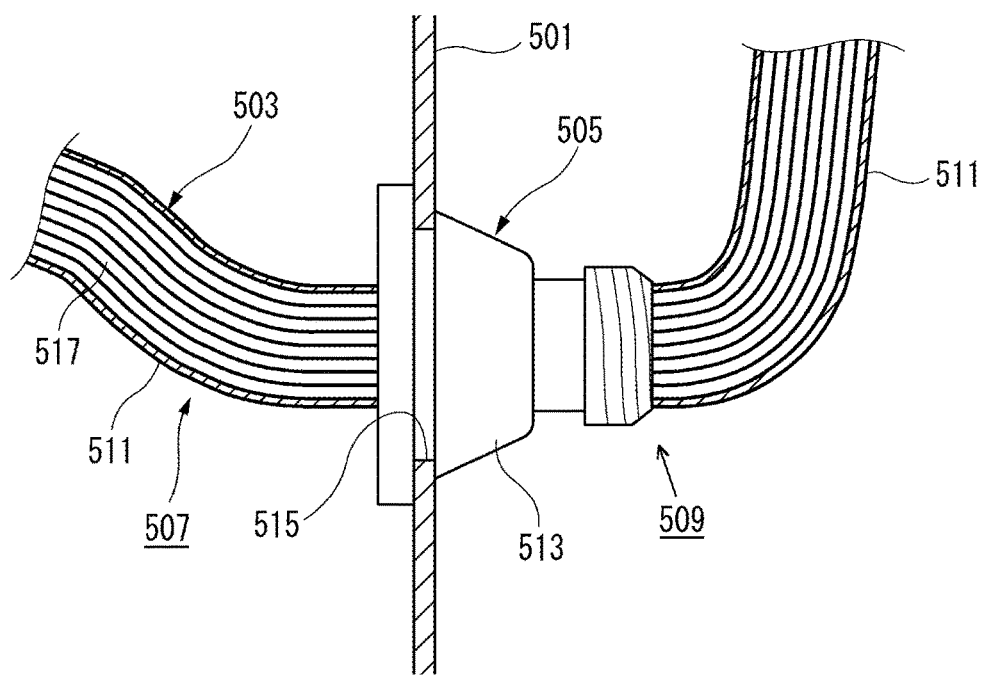
FIG. 8 is a side view of a body panel penetrating part in a related art in which a wire harness is wired.
Figure 9:
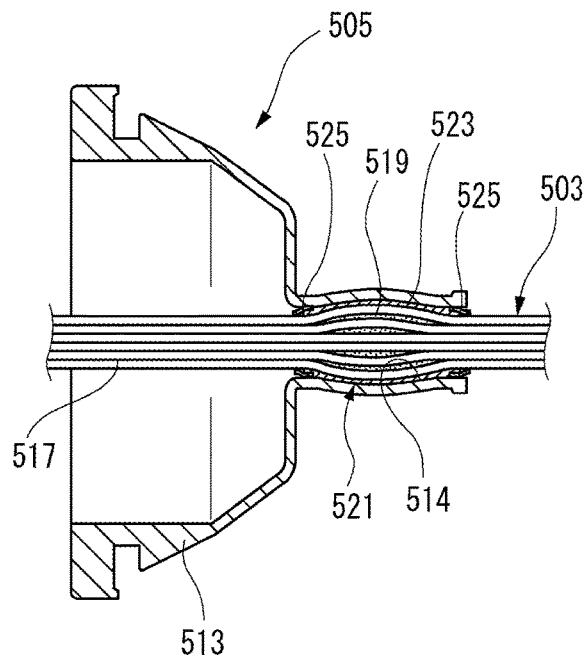
FIG. 9 is a sectional view of a waterproofing structure in a related art in which a grommet is used.
Figure 10:
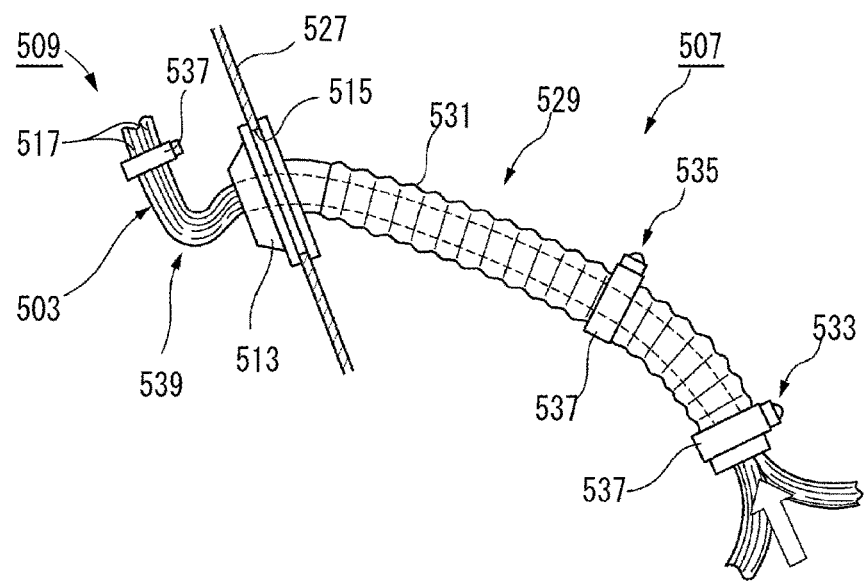
FIG. 10 is a side view of another waterproofing structure in a related art in which a grommet is used.

FIG. 7 is a sectional view of a wire harness waterproofing structure in which the tubular part 29 is provided at the side of the compartment inside part.

As shown in FIG. 7, the tubular part 29 may be provided in the compartment inside part 15, besides that the tubular part 29 is provided in the compartment outside part 13. In this case, the upper end opening part 41A of the tubular part 29 is arranged upward in the compartment inside part 15. That is, for the grommet 25 of the present embodiment, the lower end opening part 43A that is one end of the tubular part 29 is located at the wet part 45, and the upper end opening part 41A of the tubular part 29 is highly arranged with a predetermined distance X3 from the lower end opening part 43A. The upper end opening part 41A side of the tubular part 29 of this predetermined distance X3 becomes a waterproofing area.

In this way, the wire harness waterproofing structure according to the present embodiments can be appropriately adapted depending on a harness course of the compartment outside part 13, a vehicle body shape or the like.

Therefore, according to the wire harness waterproofing structure of the present embodiments, the waterproofing operation time can be shortened and the wire harness waterproofing structure is inexpensive.

Only by winding some electric wires 31, it is possible to surely waterproof, and the operativity is preferable. Further, it is possible to easily design depending on wiring conditions of the wire harness 11 (the predetermined distances X1, X2 and X3, and the length of the grommet 25).

The wire harness waterproofing structure of the present invention is not restricted to the above-described embodiments, and suitable modifications, improvements and the like can be made. Moreover, the materials, shapes, dimensions, numbers, installing places, and the like of the components in the above embodiments are arbitrarily set as far as the invention can be attained, and not particularly restricted.

The present application is based on Japanese Patent Application No. 2012-107892, filed on May 9, 2012, the entire contents of which are incorporated herein by reference.

INDUSTRIAL APPLICABILITY

There is provided an inexpensive wire harness waterproofing structure which can shorten the waterproofing operation time.

REFERENCE SIGNS LIST

11 . . . wire harness
13 . . . compartment outside part
15 . . . compartment inside part
17 . . . body panel
25 . . . grommet
27 . . . rising wired part
29 . . . tubular part
31 . . . electric wire
33 . . . diameter-increased part
35 . . . body part
37 . . . through hole
41 . . . upper end opening part (one end)
43 . . . lower end opening part
56 . . . large diameter electric wire
57 . . . middle diameter electric wire
58 . . . middle diameter electric wire
59 . . . small diameter electric wire

The invention claimed is:

1. A wire harness waterproofing structure comprising:
   a grommet that includes:
      a pipe-formed body part, a periphery of which is watertightly attached to a through hole which is bored in a body panel which separates a compartment outside part and a compartment inside part; and
      a tubular part, one end of which is connected to the pipe-formed body part;
   a wire harness that includes a plurality of electric wires inserted through the tubular part in an unbound state and is wired with a predetermined height difference relative to the through hole; and
   a diameter-increased part provided on at least one of the electric wires to form a gap between electric wires adjacent to the one of the electric wires,
   wherein the diameter-increased part comprises a protruded part protruding from a coating of the at least one of the electric wires, the coating extending across and beyond the diameter-increased part at both sides of the diameter-increased part in a longitudinal direction of the wire harness, and
   wherein the diameter-increased part of said one of the electric wires is in contact with an outer circumference of a second of the electric wires other than a second diameter-increased part of the second of the electric wires,
   wherein the diameter-increased part and the second diameter-increased part are within the tubular part,
   wherein the electric wires comprise different diameters
   wherein the diameter-increased part is provided on the at least one of the electric wires which comprises a largest diameter of the different diameters, wherein others of the electric wires, having smaller diameters than the largest diameter, have other diameter-increased parts, including the second diameter-increased part, provided thereon and staggered along a length of the wire harness in the longitudinal direction, and
   wherein second other ones of the electric wires, having further smaller diameters than the smaller diameters of the electric wires, do not have second other diameter-increased parts provided thereon along the length of the wire harness in the longitudinal direction.

2. The wire harness waterproofing structure according to claim 1,
   wherein the one of the electric wires has the largest outer diameter among the plurality of electric wires.

3. The wire harness waterproofing structure according to claim 2,
   wherein the plurality of electric wires comprise outer diameters different from each other, and
   the diameter-increased part is of a plurality of diameter-increased parts, including the second diameter increased part, provided on all of the electric wires having an outer diameter equal to or larger than a predetermined diameter determined in accordance with the predetermined height difference.

4. The wire harness waterproofing structure according to claim 2,
   wherein the plurality of electric wire comprise same outer diameter as each other, and
   the diameter-increased part is of a plurality of diameter-increased parts, including the second diameter increased part, provided on all of the electric wires having an outer diameter equal to or larger than a predetermined diameter determined in accordance with the predetermined height difference.

5. The wire harness waterproofing structure according to claim 1,
   wherein a passage is provided between the plurality of electric wires in a cross section taken at the diameter-increased part in the longitudinal direction of the wire harness.

6. The wire harness waterproofing structure according to claim 1,
   wherein the gap is in a range from about 0.1 mm to about 1.0 mm.

7. The wire harness waterproofing structure according to claim 1,
   wherein the diameter-increased part is of a plurality of diameter-increased parts, including the second diameter increased part, and the diameter-increased parts are provided staggered at a plurality of locations in a length direction of the wire harness.

8. The wire harness waterproofing structure according to claim 1,
wherein the wire harness is wired with a predetermined height difference relative to the through hole with respect to a gravitational direction.

9. The wire harness waterproofing structure according to claim 1, wherein a size of the gap corresponds to a thickness of the protruding part.

10. The wire harness waterproofing structure according to claim 1, wherein the plurality of electric wires are in contact with each other at a first area,
the diameter-increased part separates the electric wires adjacent to the at least one of the electric wires at a second area, and
the electric wires adjacent to the at least one of the electric wires taper outwards from the first area to the second area.

11. The wire harness waterproofing structure according to claim 1, wherein the diameter-increased part presses on an outer surface of the second electric wire such that a capillary action preventing part is formed at the gap.

12. The wire harness waterproofing structure according to claim 1, wherein the gap decreases between the second electric wire and said one of the electric wires in a direction away from the through hole along the longitudinal direction of the wire harness.

13. The wire harness waterproofing structure according to claim 1, wherein the diameter-increased part is in direct contact with an inner surface of the tubular part.

14. A wire harness waterproofing structure comprising:
a grommet that includes:
a pipe-formed body part, a periphery of which is watertightly attached to a through hole which is bored in a body panel which separates a compartment outside part and a compartment inside part; and
a tubular part, one end of which is connected to the pipe-formed body part;
a wire harness that includes a plurality of electric wires inserted through the tubular part in an unbound state and is wired with a predetermined height difference relative to the through hole; and
a diameter-increased part provided on at least one of the electric wires to form a gap between electric wires adjacent to the one of the electric wires,
wherein the diameter-increased part comprises a protruded part protruding from a coating of the at least one of the electric wires, the coating extending across and beyond the diameter-increased part at both sides of the diameter-increased part in a longitudinal direction of the wire harness, and
wherein the gap decreases between adjacent ones of the electric wires and the at least one of the electric wires in a direction away from the through hole along the longitudinal direction of the wire harness,
wherein the electric wires comprise different diameters,
wherein the diameter-increased part is provided on the at least one of the electric wires which comprises a largest diameter of the different diameters, wherein others of the electric wires, having smaller diameters than the largest diameter, have other diameter-increased parts, including a second diameter-increased part, provided thereon and staggered along a length of the wire harness in the longitudinal direction, and
wherein second other ones of the electric wires, having further smaller diameters than the smaller diameters of the electric wires, do not have second other diameter-increased parts provided thereon along the length of the wire harness in the longitudinal direction.

15. A wire harness waterproofing structure comprising:
a grommet that includes:
a pipe-formed body part, a periphery of which is watertightly attached to a through hole which is bored in a body panel which separates a compartment outside part and a compartment inside part; and
a tubular part, one end of which is connected to the pipe-formed body part;
a wire harness that includes a plurality of electric wires inserted through the tubular part in an unbound state and is wired with a predetermined height difference relative to the through hole; and
a diameter-increased part provided on at least one of the electric wires to form a gap between electric wires adjacent to the one of the electric wires,
wherein the diameter-increased part comprises a protruded part protruding from a coating of the at least one of the electric wires, the coating extending across and beyond the diameter-increased part at both sides of the diameter-increased part in a longitudinal direction of the wire harness,
wherein the electric wires comprise different diameters, and
wherein the diameter-increased part is provided on the at least one of the electric wires which comprises a largest diameter of the different diameters,
wherein the electric wires comprise different diameters,
wherein the diameter-increased part is provided on the at least one of the electric wires Which comprises a largest diameter of the different diameters, wherein others of the electric wires, having smaller diameters than the largest diameter, have other diameter-increased parts, including second diameter-increased part, provided thereon and staggered along a length of the wire harness in the longitudinal direction, and
wherein second other ones of the electric wires, having further smaller diameters than the smaller diameters of the electric wires, do not have second other diameter-increased parts provided thereon along the length of the wire harness in the longitudinal direction.

\* \* \* \* \*